(12) United States Patent
Brombach

(10) Patent No.: US 6,889,704 B1
(45) Date of Patent: May 10, 2005

(54) TAP INSERT

(76) Inventor: Frank Brombach, Kapfbuhlstrasse 33, Rheinfelden, 79618 (DE)

(*) Notice: Subject to any disclaimer, the term of this patent is extended or adjusted under 35 U.S.C. 154(b) by 0 days.

(21) Appl. No.: 10/070,646

(22) PCT Filed: Sep. 5, 2000

(86) PCT No.: PCT/DE00/03051
§ 371 (c)(1),
(2), (4) Date: Oct. 29, 2002

(87) PCT Pub. No.: WO01/18437
PCT Pub. Date: Mar. 15, 2001

(30) Foreign Application Priority Data

Sep. 6, 1999 (DE) .......................................... 199 42 340

(51) Int. Cl.[7] .............................................. F16K 27/06
(52) U.S. Cl. ................................. 137/454.5; 137/454.6; 251/311
(58) Field of Search ........................... 137/454.5, 454.6; 251/311

(56) References Cited

U.S. PATENT DOCUMENTS

| 2,757,969 A | | 8/1956 | Newell |
| 3,133,722 A | | 5/1964 | McGuire et al. |
| 3,236,495 A | * | 2/1966 | Buchholz ..................... 251/171 |
| 3,576,309 A | | 4/1971 | Buchta et al. |
| 3,735,956 A | * | 5/1973 | Matousek ............... 251/315.05 |
| 3,967,811 A | | 7/1976 | Keller |
| 4,314,581 A | | 2/1982 | Schrock |
| 4,535,970 A | | 8/1985 | MacAfee |
| 5,950,664 A | * | 9/1999 | Battaglia ...................... 137/375 |

FOREIGN PATENT DOCUMENTS

GB  827626  2/1960

* cited by examiner

*Primary Examiner*—Stephen M. Hepperle
(74) *Attorney, Agent, or Firm*—Orun & Roth

(57) ABSTRACT

This invention relates to a tap insert which is used for closing or separating conduits and can be introduced into a valve housing (1, 17) for valve inserts. An external thread (12, 23) is provided at the outside of the tap insert (2, 16, 21). The insert can be screwed in a receptacle (5) of a valve housing (1, 17) by means of said thread, whereby the receptacle is provided for valve inserts.

19 Claims, 6 Drawing Sheets

TAP INSERT

This application claims priority to Application Number 199 42 340.7 filed Sep. 6, 1999 in the German Patent Office.

BACKGROUND OF THE INVENTION

1. Field of the Invention

The present invention relates to a tap insert that is used to close or separate conduits.

2. Description of the Prior Art

Very frequently, manually operated shut-off valves are used in the distribution network of a water supply system, a heating system, or a solar heating system, for example in buildings or on building sites. These shut off valves have a handwheel, by means of which a valve head with a seal is displaced rectilinearly and perpendicularly to a valve seat in the conduit. One disadvantage of such shut off valves is that they are extremely vulnerable to wear. The number of turns that have to be completed by the handwheel in order that the valve head is sealed against the valve seat is not fixed. These means that valve can be tightened down so hard that the valve head seal becomes damaged, with the result that the valve no longer seals the conduit off as it should. The valve is particularly vulnerable to wear should the valve remain unopened for a protracted period of time, or should high water temperatures occur. This means that the valve inserts that are used in valve housing associated with the conduits have to be replace very frequently. If a number of shut off valves is defective in a building or on a building site, then the water will have to be drained of from part of the water supply network in order to replace the valve inserts. This entails considerable outlays of time and money.

In order to avoid these disadvantages, in many cases valves—in particular ball valves-are used in place of shut off valves in new buildings. These have a spherical or conical shut off body that incorporates a through channel, and the shut off body can be rotated through a predetermined angle, in most instances through 90°, by a lever. Taps of this kind are not prone to wear, but they do entail the disadvantage that they can be installed in existing conduits that already incorporate a shut off valve only at great cost. To this end, very frequently a whole section of conduit has to be removed. This is a serious disadvantage in the case of conduits that are routed through masonry.

SUMMARY OF THE INVENTION

In contrast to this, the tap insert having the inventive features entails the advantage that it can be screwed into a valve housing. To this end, there is an outside thread on the outside of the device to connect the tap insert to the housing. All that need be done to replace a valve insert with a tap insert of this kind is to screw the valve insert out of the conduit and then screw the tap insert into the existing receptacle. The valve body housing that encloses the shut off body of the tap insert has stop surfaces on its exterior, and these rest on the valve seat of the valve housing, which is provided for the valve head of a valve insert, so as to form a seal. If the shut off valve is in the closed position, the conduit is completely closed in the area of the tap insert. If the shut off body is in the open position, then the medium that is being conducted through the conduit can flow through the openings provided in the shut off valve housing and the through passageway in the shut off body. The conduit is thus opened in the area of the tap insert.

The tap insert is suitable—for instance— for Y-valves, free-flow valves, and straight-way valves. To this end, in each instance the shut off valve housing must be matched to the valve seat and the distance between the shut off valve housing and the connecting device must be matched to the particular valve body.

According to one advantageous configuration of the present invention, the shut off body housing is a sealing material. This means that the shut off body housing serves to close the through channel in the shut off body when in the closed position, to guide the shut off body in the shut off body housing, and seal the tap insert against the egress of liquid. In addition, the transition between the shut off body housing and the valve seat of the valve housing is also sealed. A separate seal is not needed in this case. Because of the fact that the shut off body has a smooth surface, and the sealing material is elastic, the shut off body can be guided in the shut off body without any frictional losses and thus without wearing. More advantageously, material that possesses good sealing properties, and within which the shut off body can be guided with very little friction, is selected for the seal. Teflon, polytetrafouroethylene (PTFE), is particularly suitable for this purpose. In most instances, the shut off body is of metal, for example, stainless steel, brass, or bronze, and has a polished surface.

According to another advantageous version of the present invention, the shut off body housing can be of metal or plastic. In this case, a seal will also be required between the shut off body and the shut off body housing, on the one hand, and between the shut off body housing and the valve seat, on the other.

According to another advantageous version of the present invention, the shut off body housing consists of two parts that are held together by a sleeve that encloses both parts form the outside, at least in part. In order to assemble the individual parts to form a tap insert, the two parts are positioned around the shut off body and fixed on the shut off body by the sleeve. These two parts have an inside shape that is matched to the shape of the shut off body. When assembled, the tap insert can be inserted into a valve housing as a complete unit. Because of its compact construction, the shut off valve housing is of a compact installed size and for this reason can be inserted into a valve housing that provides only a small installation depth.

It is preferred that the two parts of the shut off valve housing be of Teflon, and; the sleeve be of brass. Other materials are also possible.

According to another advantageous configuration of the present invention, a ball is used as the shut off body. In addition, the shut off body can be in the form of a cone or of a cylinder.

According to another advantageous configuration of the present invention, the length of the tap insert can be adjusted. This makes it possible to adjust the tap insert to the housing and with respect to the space between the valve seat and the thread that is used to screw the tap insert into place. Thus, the tap insert is extremely versatile and can be matched to each valve housing in an optimal manner. The length of the tap insert is adjusted and fixed when it is inserted into the valve housing. The length is not changed as long as the tap insert remains within the valve housing. The tap insert differs from a valve insert in this respect. In the latter, the space between the valve head and the thread that connects the valve insert with the valve housing changes each time the valve is opened or closed.

For example, a first sleeve that is guided in the connecting device can be provided to provide for length adjustment. A pin extends through this sleeve; at one end of this pin there is the shut off body and at the other end of the pin there is an actuating device. A second sleeve acts on the first sleeve and this is guided, on the end that extends from the valve housing, by a thread on the outside of the connecting device. The position of the first sleeve in the connecting device and thus the distance between the shut off housing and the connecting device can be varied by adjusting the position of the second sleeve on the connecting device.

Additional advantages and configurations of the present invention are set out in the description, the drawings, and the claims that follow.

DETAILED DESCRIPTION OF THE INVENTION

Figure 1:
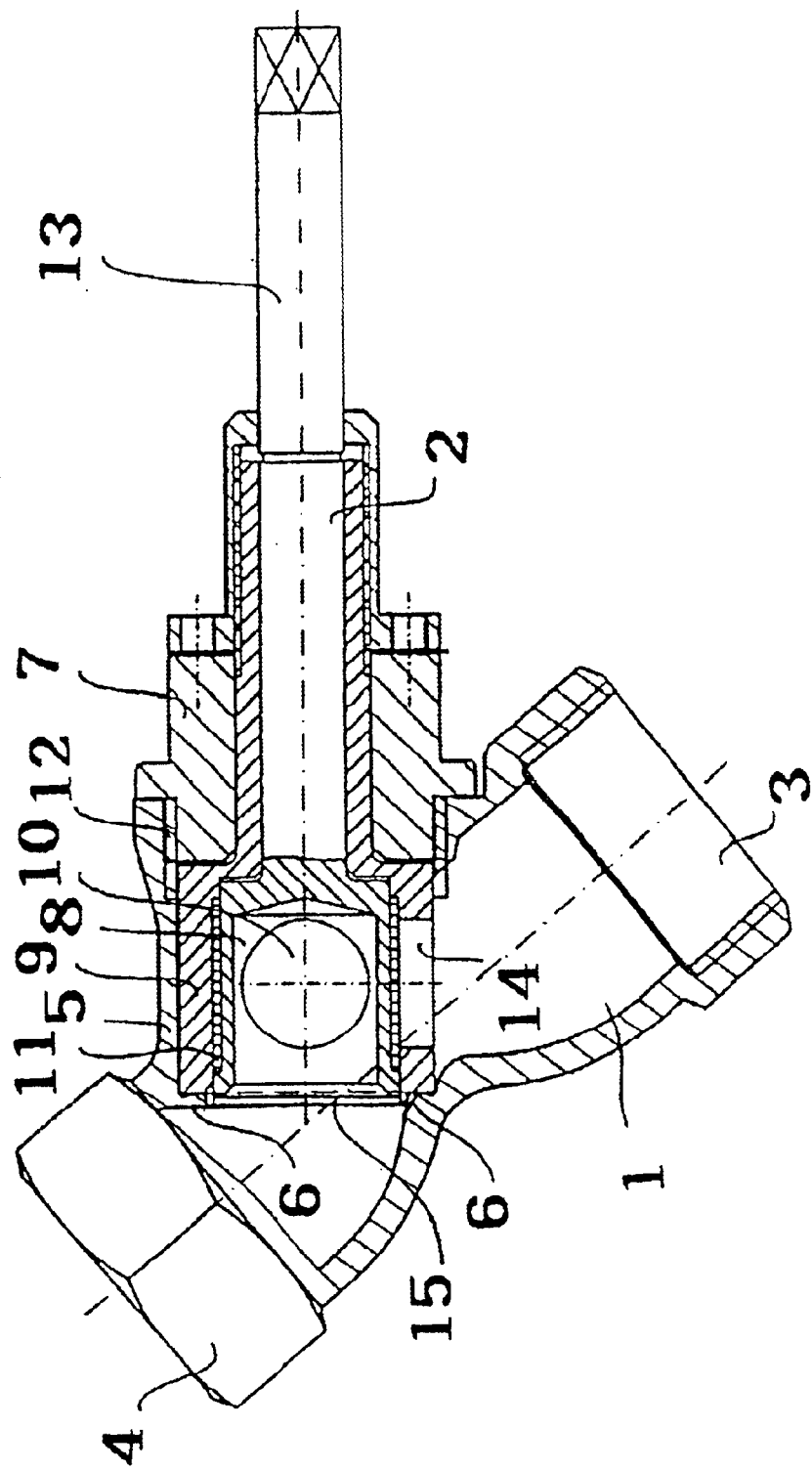
FIG. 1: Valve housing with tap insert according to a first embodiment.

FIG. 1 shows a valve housing 1 with a tap insert 2, in cross-section. The valve housing 1 has connectors 3 and 4 at its ends, and these are used to provide a connection with a conduit. IN addition, there is a receptacle 5 that has an inside thread (not shown in the drawing) into which a valve insert is usually screwed. A valve seat 6 is provided on the valve housing 1 for a valve head of a valve insert. In place of the valve insert, a tap insert 2 is installed in the valve housing. The tap insert 2 consists essentially of a device 7 that connects the tap insert to the valve housing 1, a shut off body 8, and a shut off body housing 9. The shut off body is a cylindrical shape and has at the side and in the axial direction a circular opening 10 for the through channel. There is a seal 11 between the shut off body 8 and the shut off body housing 9. On the outside of the connecting device there is an outside thread 12. A pin 13 is provided on the cylindrical shut off body, and a lever can be attached to this at the end that is remote from the shut off body in order that the tap insert can be operated by hand. The shut off body housing 9 is seated on the valve seat 6 so as to form a seal. To this end, an additional seal (not shown herein) can be provided between the shut off body housing and the valve seat. Inlet and outlet openings 14 and 15 are provided in the shut off body housing 9 through which the medium that is routed through the valve housing 1 when the shut off body is in the open position can flow through the tap. If, however, the shut off body is in the closed position, the conduit is tightly closed by the tap insert 2. For this reason, the medium cannot then pass through the tap.

Figure 2:
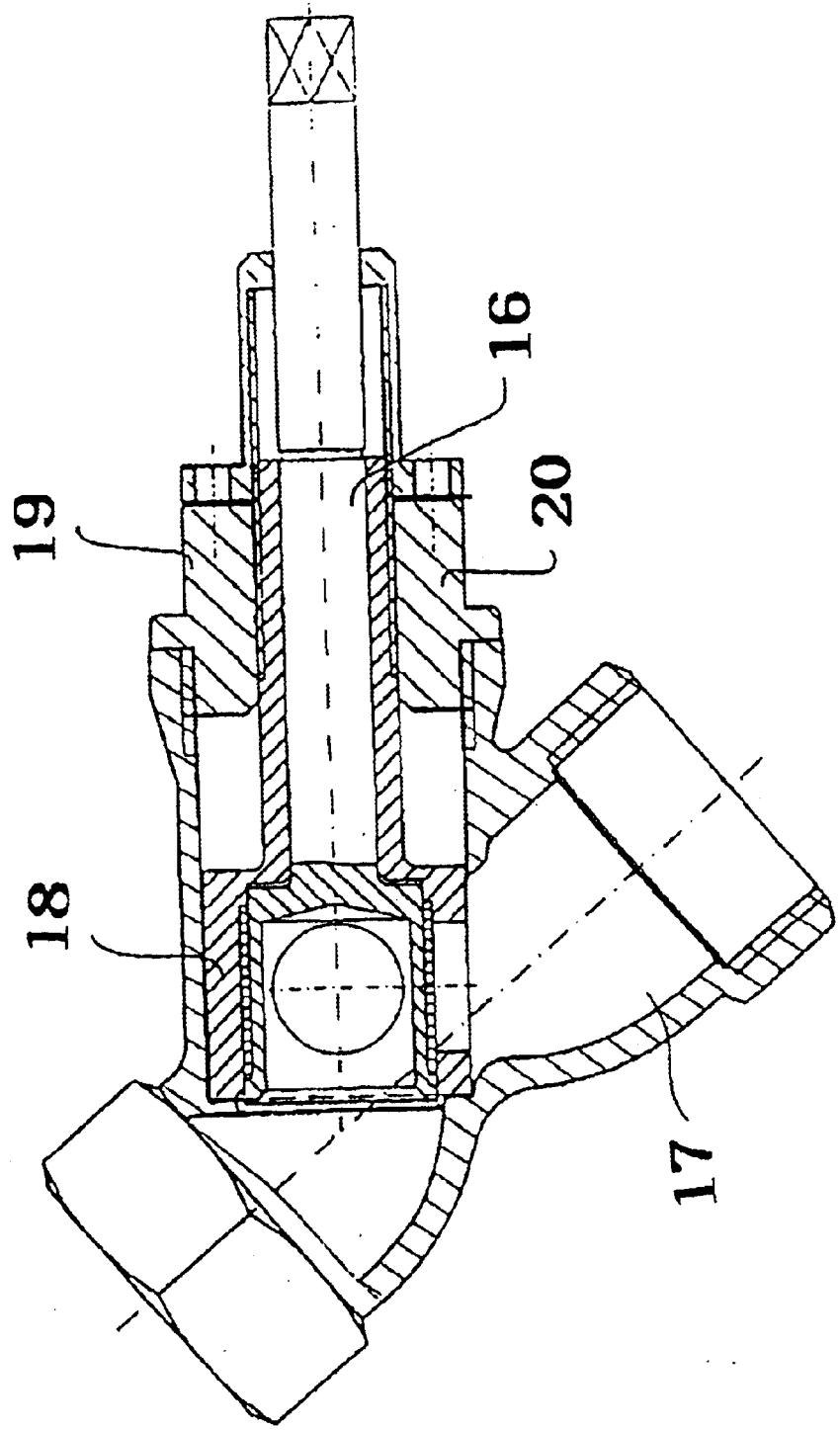
FIG. 2: Valve housing with tap insert according to a second embodiment.

In FIG. 2, another embodiment of the tap insert 16 is shown in a valve housing 17. This embodiment differs from the first embodiment shown in FIG. 1 in that the distance between the shut off body housing 18 and device 19 for providing a connection to the valve housing 17 is greater. All the other parts are the same as those shown in FIG. 1. The tap insert can be so configured that its length can be adapted to different valve housings. To this end, a part 20 that extends from the valve housing 17 can be changed relative to its distance from the shut off body housing.

Figure 3:
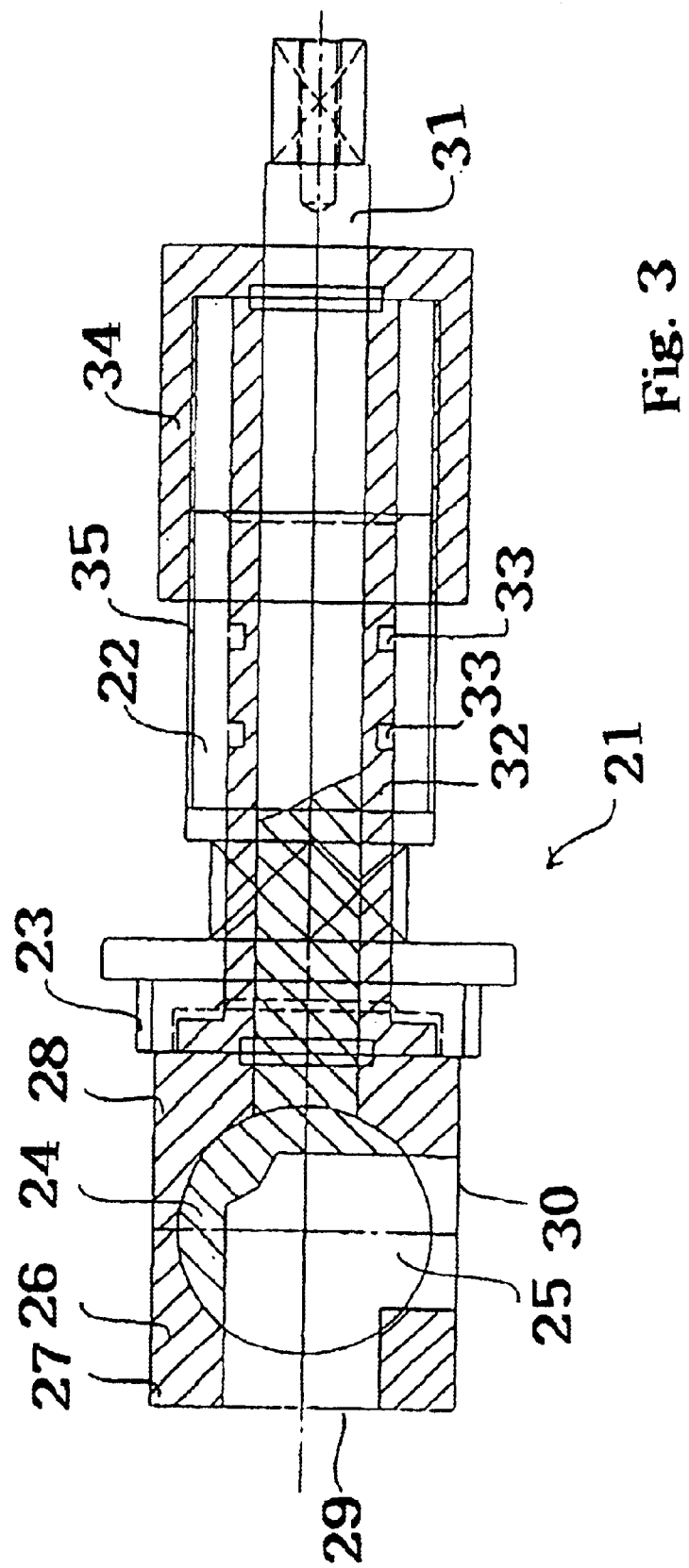
FIG. 3: Tap insert in cross-section (third embodiment)
Figure 4:
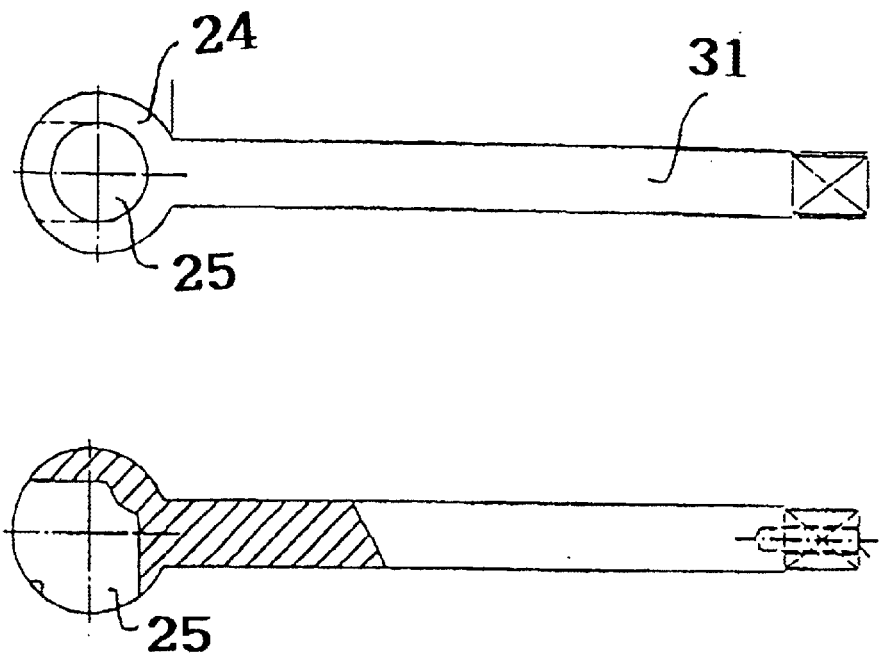
FIG. 4: Ball with ball pin of the tap insert as shown in FIG. 3.
Figure 5:
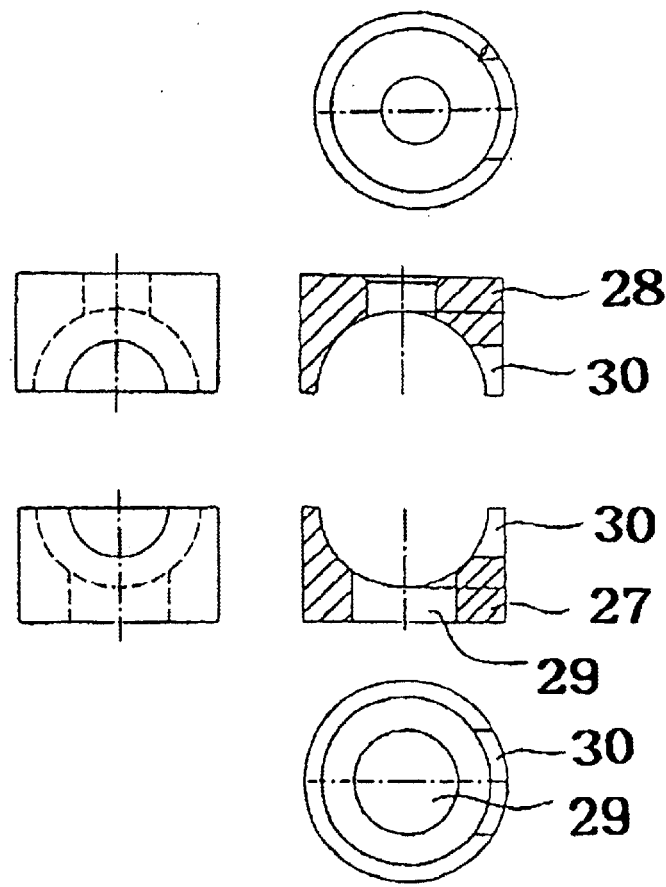
FIG. 5: Shut off body housing of the tap insert as shown in FIG. 3.
Figure 8:
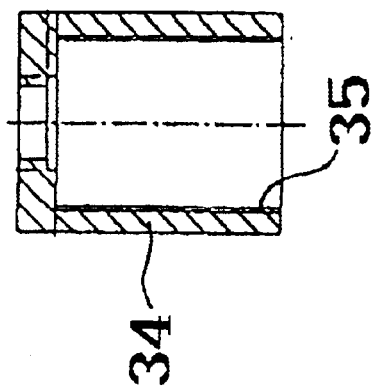
FIG. 8: Second sleeve of the tap insert as shown in FIG. 3.
Figure 7:
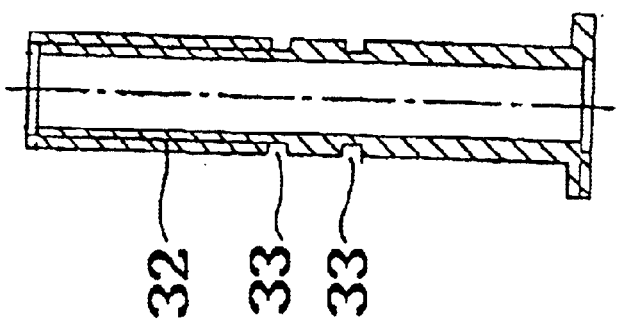
FIG. 7: First sleeve of the tap insert as shown in FIG. 3.
Figure 6:
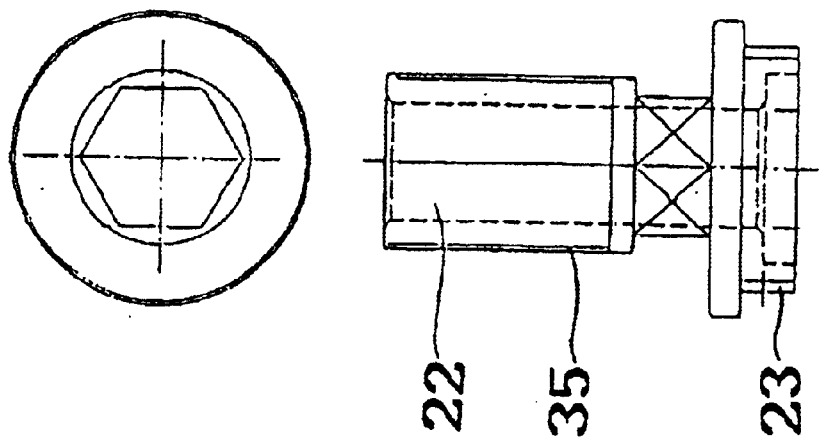
FIG. 6: Connecting device with the valve housing for the tap insert shown in FIG. 3.

FIG. 3 shows a third embodiment of a tap insert 21 in cross section. The device 22 that connects the tap insert to the valve housings has an outside thread 23 on its exterior. The shut off body consists of a ball 24 that incorporates a through channel 25. The shut off body housing 26 is of a cylindrical shape and comprises two parts 27 and 28 that enclose the ball 24 like a shell. Both of these parts are of Teflon, PTFE, and thus serve to guide the ball, act as a seal, and close the through channel when in the closed position. Openings 29 and 30 that are matched to the through channel 25 are provided in both parts 27 and 28; when the shut off body is in the open position these permit the medium to flow through the tap insert. A ball pin 31 to which a lever can be attached at the end that is remote from the ball is provided so that the ball can be operated manually. The ball pin 31 is guided in a first sleeve 32. The sleeve extends within the device 22. Grooves 33 for sliding rings are provided on the outside of the first sleeve. A second sleeve 34 fits on the first sleeve at the end of the first sleeve 32 that is remote from the ball. The second sleeve is guided by a fine thread 35 on the outside of the connecting device 22. The first sleeve is displaced within the device 22 by screwing the second sleeve 34 onto the device 22. This changes the distance between the shut off body housing 26 and the device 22. In this way, the length of the tap insert 21 can be changed and adapted to different valve housings with respect to the distance between the receptacle of the insert and the valve seat. In order to install the tap insert 21 in a valve housing, the distance between the shut off body housing 26 and the device 22 is first minimized. Then the tap insert 21 is screwed into the valve housing by the outside thread 23. Finally, the second sleeve 34 is screwed on to the device 22 until the shut off body housing 26 is seated on the valve seat of the valve housing. The adjustment of the second sleeve 34 is not changed for as long as the tap insert is installed. The individual parts of the tap insert 21 are shown in FIG. 4 to FIG. 8.

Figure 9:
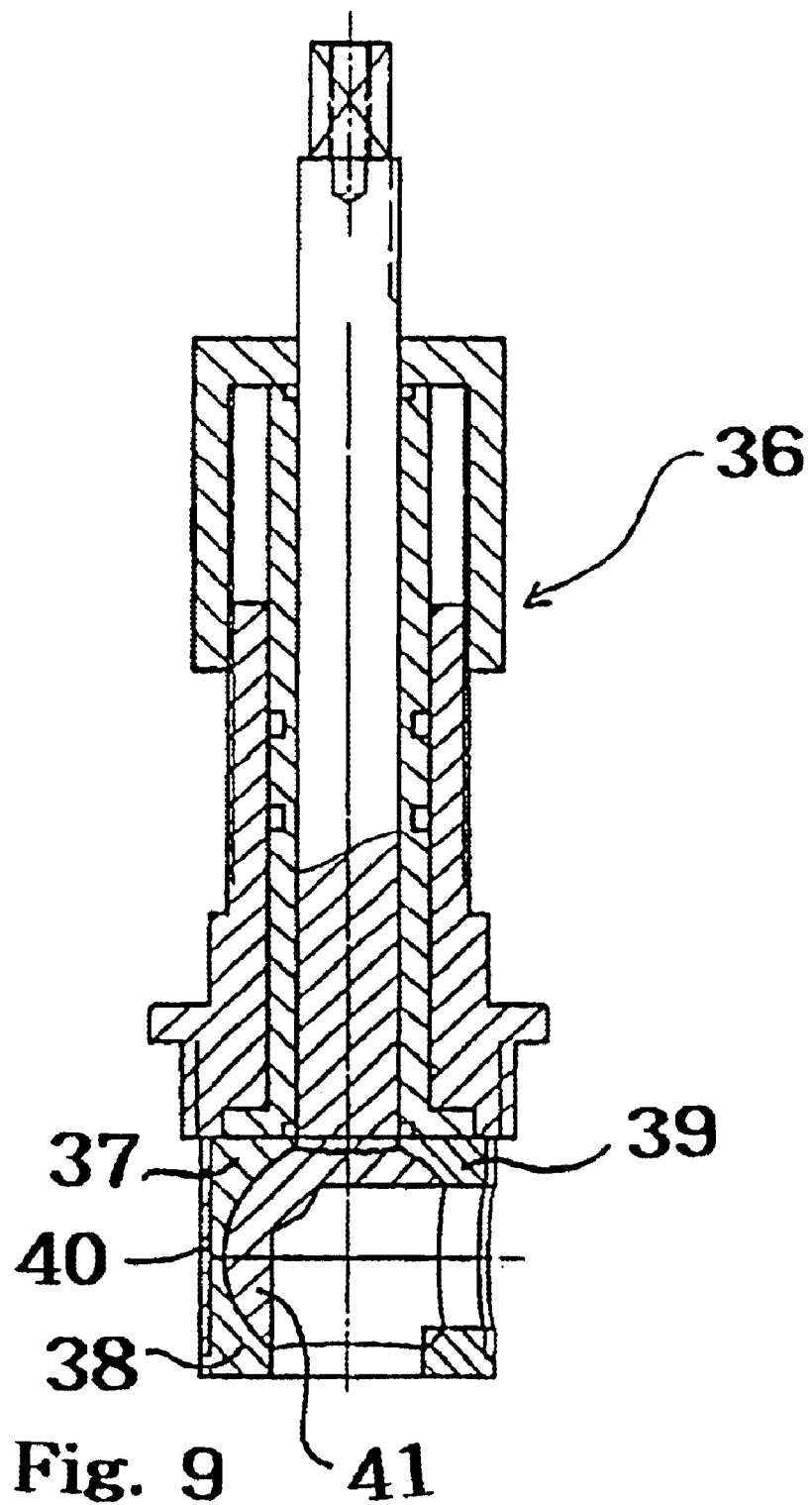
FIG. 9: A fourth embodiment of the tap insert, in cross section.

In FIG. 9, a fourth embodiment of the tap insert 36 is shown in a cross section. This tap insert is essentially the same as the tap insert shown in FIG. 3. Unlike the tap insert shown in FIG. 3, in this embodiment the shut off body housing consists of two smaller parts 38 and 39 that are held together by a sleeve 40. Thus, the shut off body housing 37 is only slightly larger than the diameter of the ball-shaped shut off body 41. Thus, the tap insert is relatively small when installed, and can be used in short valve housings.

All of the features set out in the description, in the claims that follow, and in the drawings appended hereto are essential to the present invention, either singly or in any combination with each other.

What is claimed is:

1. Tap insert for closing or separating conduits which can be installed in a valve housing connected with a conduit, comprising:

a device for connecting a tap insert with the valve housing, said connecting device having an external thread on an outside surface which can be screwed into the valve housing;

a shut-off body rotably disposed in the device, said shut-off body provided with a through channel;

an actuating device for rotating the shut-off body; and a shut-off body housing surrounding the shut-off body, the shut-off body housing closing the through channel when in a closed position, the shut-off body housing provided with shut-off surfaces on its exterior that lie on a valve seat of the valve housing, wherein the length of the tag insert is adjustable.

2. A tap insert as defined in claim 1, wherein the shut-off body housing comprises a sealing material.

3. A tap insert as defined in claim 1, wherein the shut-off body housing comprises metal or plastic; and a seal is provided on the shut-off body housing.

4. Tap insert for closing or separating conduits which can be installed in a valve housing connected with a conduit, comprising:

a device for connecting a tap insert with the valve housing, said connecting device having an external thread on an outside surface which can be screwed into the valve housing;

a shut-off body rotably disposed in the device, said shut-off body provided with a through channel;

an actuating device for rotating the shut-off body; and a shut-off body housing surrounding the shut-off body, the shut-off body housing closing the through channel when in a closed position, the shut-off body housing provided with shut-off surfaces on its exterior that lie on a valve seat of the valve housing, wherein the shut-off body housing consists of two parts that are held together by a sleeve that encloses at least a portion of both parts.

5. A tap insert as defined in claim 4, wherein the two parts of the shut-off body housing are comprised of polytetraflouroethylene and the sleeve is comprised of brass.

6. A tap insert as defined in claim 4, wherein the shut-off body is a ball, cone or cylinder.

7. A tap insert as defined in claim 6, wherein the shut-off body is a cone or cylinder.

8. A tap insert as defined in claim 6, wherein the shut-off body is a ball.

9. A tap insert as defined in claim 4, wherein the shut-off body housing comprises a sealing material.

10. A tap insert as defined in claim 9, wherein the sealing material is polytetraflouroethylene.

11. A tap insert as defined in claim 4, wherein the shut-off body housing comprises metal or plastic and a seal is provided on the shut-off body housing.

12. A tap insert as defined in claim 11, wherein the seal is polytetraflouroethylene.

13. Tap insert for closing or separating conduits which can be installed in a valve housing connected with a conduit, comprising:

a device for connecting a tap insert with the valve housing, said connecting device having an external thread on an outside surface which can be screwed into the valve housing;

a shut-off body rotably disposed in the device, said shut-off body provided with a through channel;

an actuating device for rotating the shut-off body; and a shut-off body housing surrounding the shut-off body, the shut-off body housing closing the through channel when in a closed position, the shut-off body housing provided with shut-off surfaces on its exterior that lie on a valve seat of the valve housing;

a first sleeve, said first sleeve guided in the connecting device so as to adjust the length of the tap insert; and a second sleeve that has a thread and fits on the first sleeve, said second sleeve is located on an end of the connecting device distal from the valve housing.

14. A tap insert as defined in claim 13, wherein the shut-off body is a ball, cone or a cylinder.

15. A tap insert as defined in claim 13, wherein the shut-off body housing comprises a sealing material.

16. A tap insert as defined in claim 13, wherein the shut-off body housing comprises metal or plastic and a seal is provided on the shut-off body housing.

17. Tap insert for closing or separating conduits which can be installed in a valve housing connected with a conduit, comprising:

a device for connecting a tap insert with the valve housing, said connecting device having an external thread on an outside surface which can be screwed into the valve housing;

a shut-off body rotably disposed in the device, said shut-off body provided with a through channel;

an actuating device for rotating the shut-off body;

a shut-off body housing surrounding the shut-off body, the shut-off body housing closing the through channel when in a closed position, the shut-off body housing provided with shut-off surfaces on its exterior that lie on a valve seat of the valve housing;

a first sleeve, said first sleeve guided in the connecting device so as to adjust the length with the tap insert; and a second sleeve that has a thread and fits on the first sleeve, said second sleeve is located on an end of the connecting device distal from the valve housing;

wherein said shut-off body is a ball, cone or cylinder.

18. A tap insert as defined in claim 17, wherein the shut-off body housing comprises a sealing material.

19. A tap insert as defined in claim 17, wherein the shut-off body housing comprises metal or plastic and a seal is provided on the shut-off body housing.

* * * * *